United States Patent Office 3,654,251
Patented Apr. 4, 1972

3,654,251
CROSSLINKING POLYMERS
Gaetano F. D'Alelio, 2011 E. Cedar St.,
South Bend, Ind. 46617
No Drawing. Filed Nov. 25, 1968, Ser. No. 778,850
Int. Cl. C08f 3/64, 15/26
U.S. Cl. 260—88.3     18 Claims

ABSTRACT OF THE DISCLOSURE

This invention relates to crosslinkable polymers having a plurality of repeating units of the formula

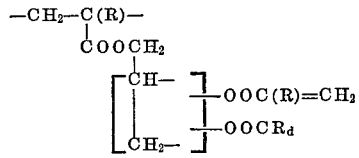

or a mixture of repeating units of the formulas

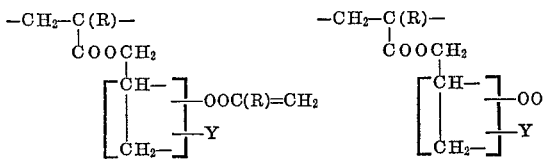

In which R represents H and $CH_3$, $R_d$ represents an unsaturated hydrocarbon group containing 15 to 20 carbon atoms and consisting of a terminal $CH_3$ group and at least one and no more than four —CH=CH— groups and the remainder —$CH_2$— groups, and Y represents —OH or R'COO— wherein R' is a monovalent hydrocarbon containing one to 20 carbon atoms. These polymers are multipurpose polymers and are converted to crosslinked polymers by air drying or by radical and thermal initiation, and by ultraviolet and ionizing radiation.

PRIOR ART

My copending application, Ser. No. 581,688, filed Sept. 26, 1966, now abandoned claims related polymers containing pendant acrylic groups in which the repeating unit is

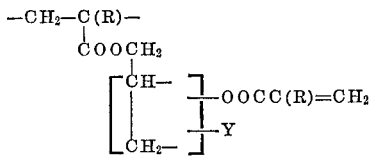

However, polymers in which Y is $R_dCOO$— are not disclosed or claimed.

THE DISCLOSURE

This invention relates to crosslinkable polymers. More specifically, it relates to crosslinkable polymers having activated vinyl or vinylidene pendant groups extending from the linear polymer chain. Particularly it relates to a specific type of polymer having (1) acrylic or methacrylic ester moieties,

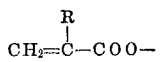

as well as (2) $R_dCOO$— ester moieties extending as branches from a linear polymer molecule, wherein,

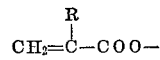

is the residue of the acid

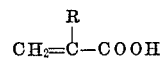

in which R represents hydrogen and methyl, and

is the residue of an unsaturated, fatty acid containing 16 to 21 carbon atoms consisting of a terminal $CH_3$ group and at least one and no more than four —CH=CH— groups and the remainder consists of —$CH_2$— groups. Still more particularly it relates to polymers especially suited to crosslinking in view of the sensitive groups therein.

The polymers of this invention are readily crosslinked by radical, anionic and cationic initiators and effectively, also, by irradiation and by air drying. Related polymers containing only the acrylic or methacrylic ester moieties do not airdry and those containing only $R_dCOOH$ ester groups are not sensitive to irradiation. Thus the polymers of this invention are multipurpose polymers.

Many monomers as well as polymers have been subjected to ionizing radiation to convert them to improved or modified products. However, irradiation processes have been primarily of scientific interest, and very little use of such irradiation polymer processes has been made industrially. This is primarily due to economic factors because of the cost of the ionizing radiation delivered to the system to be treated. For example, the well-known low cost polyester systems, which consist of a mixture of about equal parts by weight of styrene monomer and unsaturated alkyd resin prepared from maleic or fumaric anhydride, phthalic anhydride, and ethylene glycol or diethylene glycol, can in most cases, be more economically polymerized by free radical initiators than by ionizing radiation which requires 10 or more megarads, depending on the formulation.

Such systems can be improved, however, by the elimination or reduction of phthalic anhydride in the formulation of the polyester and substituting more expensive monomeric acrylic compounds for the styrene. Even in such systems, the economic factors are unfavorable not only because of the much higher cost of the mixture but because of the high volatility of the acrylic or methacrylic monomeric compounds used. Even in such cases, the irradiation dose required is uneconomical, and when the irradiations are performed in air, the systems are highly inhibited by oxygen. The addition of substances such as acetone or methyl ethyl ketone reduce the air inhibition only to a minor extent. Even then, the products possess the undesirable odor of unpolymerized acrylic monomer unless very high dosages are used.

Consequently, it is desirable to develop polymeric compositions in which the oxygen inhibition has been reduced or is absent and which can be readily converted to crosslinked, insoluble, infusible polymers by exposure to ionizing radiation in doses of less than 10 megarads.

It has now been found that crosslinking of various polymeric compositions containing both the

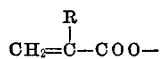

and $R_dCOO-$ ester linkages can be effected with economical radiation doses by the use of various polymers of this invention. It is believed that this is due to the $R_d$ structure in the $R_dCOO-$ ester group in which the $$-CH=CH-$$

react with the oxygen in the air, preventing the oxygen from reacting, during irradiation, with the radiation-sensitive

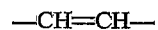

groups. Furthermore, such radiation-sensitive polymers and various modifications thereof can be used as multipurpose polymers in that they can be cured also by air-drying or by radical, anionic or cationic initiation.

The polymers of this invention have a plurality of repeating units in the linear chain thereof having the formula

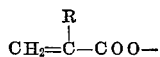

(A)

wherein the number ($n$) of repeating units is at least two and preferably at least five, and wherein there is attached to the glyceryl group,

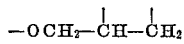

at least one $CH_2=C(R)-COO-$ group and at least one $R_dCOO-$ group, in which R is selected from the class of H and methyl and $R_d$ represents an unsaturated hydrocarbon containing 15 to 20 carbon atoms and consisting of 1 to 4 —CH=CH— groups and the remainder —$CH_2-$ groups. The $CH_2=C(R)COO-$ and the $R_dCOO-$ groups can be attached to the same or different $$-OCH_2-CH-CH_2-$$

groups. Thus, the repeating units represented by Formula A are selected from polymers containing (1) the repeating unit of the formula

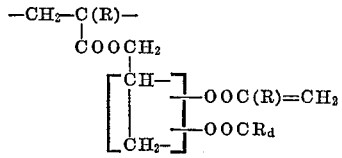

or (2) at least one pair of repeating units

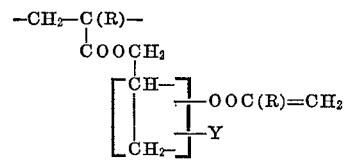

and

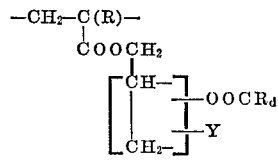

wherein R and $R_d$ are as defined above, the number of each type of repeating unit in the mixture is at least one (represented by $n'$ and $n''$ respectively), Y is selected from the class of —OH, and R'COO— wherein R' is a monovalent hydrocarbon radical containing one to twenty carbon atoms; thus R'COO— includes $CH_2=C(R)COO-$ and $R_dCOO-$.

Various hydrocarbon groups represented by R' in the R'COO— formula include aliphatic, cycloaliphatic and aromatic hydrocarbon radicals such as methyl, ethyl, propyl, butyl, amyl, hexyl, octyl, nonyl, dodecyl, octadecyl, cyclohexyl, cycloheptyl, phenyl, tolyl, xylyl, naphthyl, diphenyl, methylcyclohexyl, ethylcycloheptyl, cycloheptylpropyl, phenethyl, ethylphenyl, butylnaphthyl, octyldiphenyl, butenyl, octenyl, phenylbutenyl, styryl, cyclohexylpropenyl, etc. While acetylenic, spiro and various other less common types of hydrocarbon groups can also be used these are more expensive and less practical for the purpose of this invention.

Typical preferred acyloxy groups include, in addition to the acryloxy and $OOCR_d$ groups, acetoxy, formyloxy, propionoxy, benzoxy, phenylacetoxy and butyroxy.

For the purpose of this invention, it is not necessary that the $CH_2=C(R)COO-$ and $R_dCOO-$ functions be attached to the same glyceryl groups

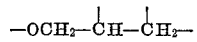

these functions can be attached to different glyceryl groups since the crosslinking characteristics of the polymers in which the $CH_2=C(R)COO-$ and $R_dCOO-$ functions are attached to different pendant

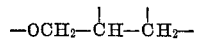

groups are similar to those in which they are attached to the same

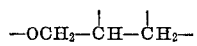

group. The only requirement of this invention is that the polymer contains both $CH_2=C(R)COO-$ and $R_dCOO-$ functions. The ratio of $CH_2=C(R)COO-$ to $R_dCOO-$ groups can be varied over a wide range of the order of 1:100 to 100:1, the preferred range being of the order of 10:1 to 1:10.

When the polymeric compositions of this invention are to be crosslinked by the application of radiation, it is advantageous, if economical, to have no aromatic or only a very minor amount of aromatic nuclei therein, since aromatic nuclei act as energy sinks. For purposes other than radiation, the polymers of this invention can have aromatic nuclei therein and can be crosslinked by chemical means or can be used as crosslinking agents or modifiers for other polymers having substantial amounts of aromatic nuclei. As pointed out more fully hereinafter, the polymers of this invention have various other uses and advantages per se, or in modifying other polymers.

The polymers of this invention are conveniently prepared by the reaction of the mixed

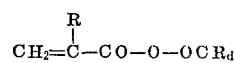

anhydrides with a polymer having at least one molar percent in the linear chain thereof of a repeating unit having the formula

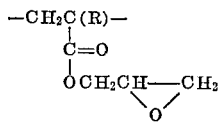

(B)

wherein R is methyl or hydrogen as defined above. There are at least two such repeating units per polymer molecule. Preferably the polymer has at least 5 molar percent of said repeating units and optimally 10–40 percent. However, polymers having as high as 100 molar percent can be used, but there is no particular added advantage in these higher percentages since they are economically less desirable.

This reaction can be represented as follows using the homopolymer for illustrative purposes:

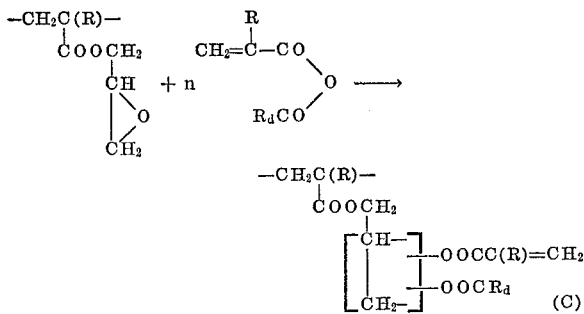

It is believed that the acryloxy group in the repeating unit is attached to the terminal carbon atom of the glycidyl group upon opening of the oxirane ring, and it is believed that the structure is predominantly of this type. However, it is considered equivalent in this invention to the arrangement where the acryloxy group is attached to the secondary carbon atom since it is believed that the product actually consists of a mixture of such structures. The reaction is preferably performed in the presence of catalytic amounts of tertiary amine such as triethylamine, tributylamine, pyridine, 1,3,5-tri-(dimethylaminomethyl)-phenol.

The mixed anhydrides of the formula $$R_dCOOOC(R)=CH_2$$

as well as other symmetrical and other unsymmetrical anhydrides, used hereinafter, are conveniently prepared by the metathesis procedure of an acyl halide and an alkali metal carboxylate given in the Journal of Organic Chemistry, 26, 1283 (1961), as for example, $$R_dCOCl + CH_2=C(R)COONa \rightarrow R_dCOOOC(R)=CH_2$$

or $$R_dCOONa + CH_2=C(R)COCl \rightarrow R_dCOOOC(R)=CH_2$$

Distillation of high boiling mixed anhydrides causes disproportionation of such anhydrides and preferably they are used as prepared without distillation. However, the presence of disproportionated products, which in this case are $(R_dCO)_2O$ and $[CH_2=C(R)CO]_2O$, can be used since this mixture will still esterify the polymer having the repeating units shown in structure (B) and introduce both the $R_dCOO-$ and $CH_2=C(R)COO-$ functions into the polymer structure.

Alternately, the polymer of structure (B) may be reacted first in part with the symmetrical anhydride $$(R_dCO)_2O$$

and then with $[CH_2=C(R)CO]_2O$ in which case, the functions are located on different glyceryl groups, thus

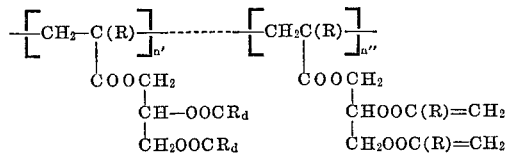

In a similar way, $[CH_2=C(R)CO]_2O$ may be reacted before the reaction with $(R_dCO)_2O$.

In the above formula the values of $n'$ and $n''$ for the respective repeating units will vary according to the molar percent of the corresponding monomers used in the reaction mixture. Moreover, while the repeating units are shown grouped in the respective brackets of the formula, these repeating units can be intermingled at random throughout the linear copolymer.

Crosslinkable polymers within the scope of this invention can also be prepared by reacting the polymer of structure (B) first with $R_dCOOH$, and then with $$CH_2=C(R)COOH$$

or with a mixture of $R_dCOOH$ and $CH_2=C(R)COOH$, in which case opening of the epoxy ring occurs generating a free hydroxyl group, thus

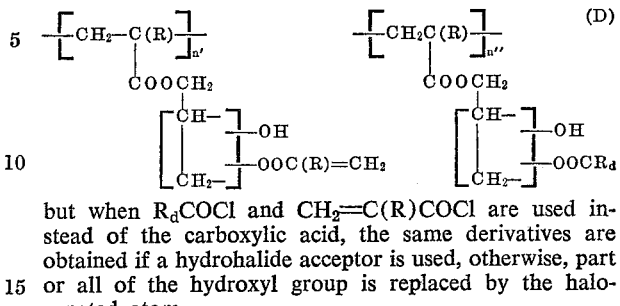

but when $R_dCOCl$ and $CH_2=C(R)COCl$ are used instead of the carboxylic acid, the same derivatives are obtained if a hydrohalide acceptor is used, otherwise, part or all of the hydroxyl group is replaced by the halogenated atom.

When it is desired to modify the properties of the resulting polymer (D), the hydroxyl group can be reacted with acylating agents to convert the hydroxyl group to an ester group. For example, the hydroxyl group can be converted to any saturated or unsaturated ester group, including the $R_dCOO-$ and $CH_2=C(R)COO-$ groups already attached to the structure. The esterification of the hydroxyl groups can be achieved by reaction with the acids, anhydrides or chlorides of the R'COOH acids where R' represents a hydrocarbon radical of one to 20 carbon atoms. Illustrative examples of such acylating agents are acetic anhydride, benzoyl chloride, stearoyl chloride, acrylic anhydride, oleyl chloride, trichloroacetyl chloride, monoethyl fumaroyl monochloride, etc.

The glycidyl polymers (B) used in the above reaction can be prepared by the vinyl polymerization of the glycidyl acrylate type monomer, by means of radical imtiators such as the peroxy and azo catalyst. Of the azo-type catalysts, azobisisobutyronitrile is especially preferred. If peroxide catalysts are used in such polymerizations, they are advantageously of the aliphatic types such as stearyl or lauroyl peroxide, etc. However, benzoyl peroxide, tertiary butyl peroxide and other well-known peroxy catalysts such as tertiary butyl peracetate can also be used.

Where a glycidyl acrylate homopolymer of (B) is desired, this can be obtained readily by polymerization in a suitable organic solvent such as ethyl acetate. Preferred, however, are the ketones such as methyl ethyl ketone, methyl isobutyl ketone, acetone, etc., as solvents. In such cases, a solution of 25–60% of the monomer in the ketone is used.

For copolymerizations in which there is a major part of a comonomer, other solvents such as toluene, benzene, tetrahydrofuran, etc. can be used as the medium for the polymerization. With azo-type catalysts, the polymerization temperature is advantageously about 75–80° C., the molecular weight depending on the amount of catalyst used. For lower molecular weight polymers, 3% of an azo catalyst such as azobisisobutyronitrile, etc. is used, and for higher molecular weight polymers or copolymers, 1% or 0.1% of the azo catalyst can be used. Chain transfer agents such as dodecyl mercaptan, carbon tetrachloride and the like can also be used to control or lower the molecular weight.

In the reactions where polymer (B) is converted to the ester derivatives of this invention, it is desirable, in most cases, to use an inert gas atmosphere such as nitrogen or helium. While premature polymerization may not be sufficient in some cases to require an inhibitor it is generally desirable when a sulfonic acid is used to also have present, in order to prevent premature polymerization of the derived polymer of acrylic or other unsaturated groups, a small amount of an inhibitor, such as tertiary-butyl catechol, ditertiary butyl paracresol, hydroquinone, resorcinol or other di- or polyhydroxyphenols; phenolic resins, aromatic amines such as p,p'-phenylenediamine, 1,5-diaminonaphthalene, etc., pyrogallol, tannic acid, ascorbic acid, benzaldehyde, alpha-naphthol, sulfur compounds, etc., or other well-known inhibitors for this purpose. Such catalysts or inhibitors are generally used in an amount as low as 0.01 percent and as high as 0.5 percent by weight.

As previously indicated, when the polymers of this invention are to be used as crosslinking modifiers for compositions eventually to be treated with radiation, it is desirable that the polymers of this invention, as well as the polymers to which they are added as modifiers, contain no aromatic nuclei or only limited amounts thereof. Larger proportions of such nuclei can be tolerated but as the proportions of aromatic nuclei in the respective polymers are increased, the radiation dosages required to effect crosslinking increases accordingly apparently due to the fact that aromatic ring compounds are energy sinks for irradiation.

In the following examples, the radiation doses are reported in megarads, which represent 1,000,000 rads. A "rad" is defined as the unit of absorbed dose and is equal to 100 ergs per gram.

In view of the fact that radiation dosage previously required to effect a practical degree of crosslinking in most polymers was sufficiently high so as to be uneconomical and in many cases it was accompanied by degradation of the polymer, it is particularly important that blending with the polymers of this invention permits crosslinking of such polymers to be effected at lower radiation dosages, as described more fully hereinafter. The polymers of this invention have a particular utility for modifying various types of resins for subsequent radiation, such as polyesters, both saturated and unsaturated, including maleic-ethylene glycol, phthalic-ethylene glycol, polyvinyl acetate, polyethylene terephthalate, methyl methacrylate, etc., polyvinyl chloride, polyamides, such as nylon and polycaprolactamide, etc.

As the starting polymer, glycidyl acrylate can be copolymerized with other vinyl monomers such as the acrylic and methacrylic esters such as the methyl, ethyl, propyl, butyl, hexyl, cyclohexyl, dodecyl, etc. esters. In addition to, or in lieu of these acrylic type esters used in copolymerization with the glycidyl acrylate to prepare the starting polymer, any other copolymerizable monovinyl or monovinylidene comonomer or mixtures thereof can be used, for example, the vinyl esters, that is vinylacetate, and the monovinyl esters of saturated and unsaturated aliphatic, monobasic and polybasic acids, and more specifically the vinyl esters of the following acids: propionic, isobutyric, valeric, caprylic, caproic, oleic, stearic, acrylic, methacrylic, crotonic, oxalic, malonic, succinic, glutaric, adipic, suberic, azelaic, maleic, fumaric, itaconic, mesaconic, hexahydrobenzoic, citric, trimesic, etc., as well as the corresponding allyl, methallyl, etc. esters of the aforementioned acids, acrylonitrile, methacrylonitrile, methacrylic acid, hydroxy propyl methacrylic, etc.; itaconic acid monoesters and diesters, such as the methyl, ethyl, butyl esters, the maleic and fumaric acid monoesters, diesters and their amide and nitrile compounds, such as diethyl maleate, maleyl diamide, fumaryl dinitrile, dimethyl fumarate, etc.; ethers, such as methallyl ethyl ether, vinyl ethyl ether, vinyl butyl ether, allyl propyl ether; cyanuric acid derivatives having one copolymerizable unsaturated group attached directly or indirectly to the triazine ring, such as allyl diethyl cyanurate, vinyl diethyl cyanurate, as well as the partial, soluble or fusible polymerizable polymers of the hereinabove listed monomers, etc.

The above aliphatic comonomers are preferred where the products are to be radiated. However, limited amounts, usually less than the molar equivalent of one or more of the above dialiphatic monomers, can be used without too large an increase in the required radiation dosage with the following aromatic comonomers. When used alone, larger radiation dosages are required. Where no radiation is to be used these aromatic monomers can be used by themselves or in combination with the aliphatic types. Typical suitable aromatic comonomers include vinyl aryl compounds such as styrene, vinyl naphthalene, vinyl toluene, vinyl xylene, vinyl phenol, vinyl ethyl benzene, vinyl dimethyl naphthalene, vinyl diphenyl, etc., vinyl phenyl ether, vinyl benzoate, vinyl naphthoate, vinyl methyl phthalate, allyl ethyl phthalate, allyl propyl phthalate, etc.

A few illustrative examples of suitable polymers which may be modified by or mixed with the crosslinkable polymers of this invention for subsequent treatment are the non-aromatic type polymers such as polyvinylacetamide, polyacrylamide, polymethylacrylamide, polyhexamethylene adipamide, polyethylene adipamide, polyethylene azelamide, polyethylenediacrylamide, polyvinyl acetate, polyvinyl chloride copolymers, polyethyl acrylate, polymethyl methacrylate, cellulose acetate, cellulose butyrate, ethyl cellulose, polyethylene adipate, polyethylene azelate, polydecamethylene succinate, polydecamethylenesebacate, the polyurethanes, natural and synthetic rubbers, etc. The polymers of this invention are also compatible with polyvinyl chloride, particularly upon the application of moderate heat.

Aromatic polymers that can be used particularly where the mixture is to be crosslinked by radical generating catalysts, include but are not limited to ethylene glycol-maleate-phthalate, ethylene glycol-phthalate, diallyl phthalate, divinyl phthalate, polyvinyl aryl, such as polystyrene, polyvinylnaphthalene, polyvinyl toluene, polyvinylbenzoate, polyvinylphenyl ether, polyvinylphenol, etc.

The polymeric compositions of this invention are particularly useful as coating compositions on all types of substrates, including cellulose in its various forms, such as paper, wood, paper board, wood board, wood pulp, regenerated cellulose in film or fiber form, laminates of various types including those prepared from fibrous fillers bonded with urea, melamine, epoxy and polyester resins, plaster board, concrete in its various forms such as slabs, blocks and the like. They may also be used as impregnants for porous bodies such as the compositions hereinabove named, as well as for synthetic and natural sponges, etc. Particularly do they find use as bonding agents and adhesives for solid, porous and foamed bodies. They can be used alone or admixed with each other or with other copolymerizable monomers, unsaturated or saturated polymers, in the absence or presence of dyes, pigments, plasticizers. For coating, impregnating or adhesive compositions where the presence of small amounts of solvent in the cured composition is not objectionable they can be mixed with volatile or non-volatile solvents best suited to the particular application.

The polymers of this invention are also useful in the preparation of copolymers with unsaturated alkyd resins. In carrying this portion of the invention into effect, an esterification product of a polyhydric alcohol and an alpha, alpha-unsaturated polycarboxylic acid is first prepared in accordance with techniques now well-known to those skilled in the alkyd resin art.

Any aliphatic polyhydric alcohol containing at least two esterifiable aliphatic hydroxy groups, or mixtures of such alcohols, can be used in preparing the unsaturated alkyd resins. Examples of such polyhydric alcohols are ethylene glycol, di-, tri- and tetra-ethylene glycols, thiodiglycol, glycerine, pentaerythritol, 1,4-dihydroxy-butene-2, dimethylol cyclohexane, dihydrocyclohexane, etc. For compositions to be eventually radiated, any non-aromatic, alpha,beta-polycarboxylic acid, or mixtures of such acids, can be reacted with the polyhydric alcohol or alcohols to form the unsaturated alkyd resin. Examples of such polycarboxylic acids are maleic, fumaric, citraconic, mesaconic, acetylene dicarboxylic, cyclohexene dicarboxylic, etc., itaconic and its homologs, as, for instance, alpha-methyl itaconic acid, alpha-alpha-dimethyl itaconic acid, etc. Anhydrides of these polycarboxylic acids can also be employed.

In some cases, instead of using an unmodified, unsaturated alkyd resin, an unsaturated alkyd resin can be used which has been internally modified by replacing a part, say up to about 75 mole percent, of the unsaturated polycarboxylic acid with saturated aliphatic polycarboxylic acids, such as succinic, adipic, glutaric, pimelic, sebacic, azelaic, suberic, tricarballylic, etc.

The esterification products of polyhydric alcohols with ethylenic polycarboxylic acids, or with aliphatic polycarboxylic acids, can be further modified by introducing as a reactant in the preparation of the alkyd resin, a monoesterifiable compound or compounds, more particularly a saturated or unsaturated normal or isomeric monohydric alcohol, or mixture thereof, a saturated or unsaturated monocarboxylic acid, or mixture thereof, or both such esterifiable monohydroxy organic compounds as well as by the use of hydroxy acids.

Examples of monohydric alcohols which can be used as modifiers of the alkyd resin are propyl, isopropyl, butyl, isobutyl, amyl, isoamyl, hexyl, octyl, decyl, dodecyl, tetradecyl, cetyl, octadecyl, cyclohexyl, cyclopentyl, etc. The use of methyl and ethyl alcohol is not precluded, but in general these alcohols are less satisfactory because of their lower boiling points. As monobasic acids there can be used, for example, the unsubstituted saturated and unsaturated normal or isomeric monocarboxylic acids containing only one esterifiable group, such as acetic, propionic, butyric to stearic, inclusive, hexahydrotoluic, acrylic, methacrylic, furoic acids, etc.

The monoesterifiable compounds can be introduced into the esterification before, during or after the esterification of the polyhydric alcohol with the polycarboxylic acid under conditions that promote interesterification of the monoesterifiable compound with the incompletely esterified polyhydric alcohol-polycarboxylic acid product. That is, the monoesterifiable compound is introduced into the reaction mass before all of the acid groups of the polyhydric acid, or all of the alcohol groups of the polyhydric alcohol have been esterified.

The term "unsaturated non-aromatic alkyd resins," as used generally herein is intended to include within its meaning both unmodified esterification products of a non-aromatic polyhydric alcohol with a non-aromatic alpha-unsaturated, alpha,beta-polycarboxylic acid and esterification products of these components which have been modified, for example, as briefly described hereinabove. An alternate term is "unsaturated aliphatic alkyd resins" (including cycloaliphatic types).

To achieve copolymerization of the unsaturated alkyd resin with the crosslinkable polymers of this invention, a solution or mixture of the unsaturated alkyd resin in the crosslinkable polymer is first effected. Copolymerization of the components of the mixture is achieved readily by the addition of radical generating catalysts, and rapidly and advantageously by ionizing radiation, such as by atomic radiation from a reactor, or from cobalt 60, or by means of high energy electrons generated by an electron linear accelerator.

Typical examples of unsaturated alkyd resins are:

Alkyd resin A.—Ethylene glycol itaconate

Parts (by wt.)
Ethylene glycol _____ 23
Itaconic acid _____ 52

The components are mixed and slowly heated in the course of one hour from room temperature to 190° C., in an inert nitrogen atmosphere, and held at this temperature for three to five hours.

Alkyd resin B.—Ethylene glycol maleate

Parts (by wt.)
Ethylene glycol _____ 31
Maleic anhydride _____ 32

The compounds are mixed and heated as in the preparation of Alkyd Resin A to 190° C., and held at that temperature for four to six hours.

Alkyd resin C.—Acetic acid-modified diethylene glycol maleate

Parts (by wt.)
Diethylene glycol _____ 108
Maleic anhydride _____ 88
Acetic anhydride _____ 10

The ingredients are mixed together and refluxed for one hour in an inert atmosphere of nitrogen after which the reaction mixture is brought to 190° C., which temperature is maintained for four to six hours.

It will be understood, of course, that this invention is not limited to the use of the specific unsaturated alkyd resins mentioned above and that a broad modification of the nature of the copolymer is possible by using other unsaturated aliphatic alkyd resins or mixture of such resins. As illustrative examples of other unsaturated alkyd resins, the following esterification products can be used, as illustrated in alkyd resin D to I. Aromatic alkyd resin J is included for comparison.

| Alkyd resin: | Components (parts) |
|---|---|
| D | Diethylene glycol (160). Maleic anhydride (147). |
| E | Diethylene glycol (106). Itaconic acid (130). |
| F | Glycerine (18.4). Itaconic acid (39.0). |
| G | Ethylene glycol (610). Maleic anhydride (19.6). Hydroxypropyl acrylate (26.0). |
| H | Ethylene glycol (20). Maleic anhydride (29.4). Succinic acid (3.3). |
| I | Diethylene glycol (30.6). Maleic anhydride (17.6). Itaconic acid (15.6). |
| J | Diethylene glycol (30.3). Maleic anhydride (13.2). Phthalic anhydride (21.7). |

In many cases, instead of copolymerizing a single polymer of this invention with a single alkyd resin, a mixture can be used of two or more of such polymers with a single alkyd resin, or a single such polymer with two or more alkyd resins, or a mixture of two or more such polymers with two or more resins.

The modified resins of this invention can be used alone or with fillers, dyes, pigments, opacifiers, lubricants, plasticizers, natural and synthetic resins or other modifying bodies in, for example, costing, molding, laminating, coating applications, and as adhesives, impregnants, and protective coatings.

In coating, impregnating and similar applications, the mixed monomeric or partially copolymerized materials, without added solvent can be applied to the object to be treated and polymerized, with or without the application of heat and pressure, to form the final insoluble polymeric composition in situ. These new synthetic materials can be used as impregnants for many porous bodies, such as cork, pottery, felts, or fabricated bodies with interstices, such as the windings of electrical coils, netted fibers, interwoven cotton or glass materials, etc. They can also be used for the production of wire coatings and winding tapes, and for protectively coating impervious articles, such as metals, or for coating and impregnating articles such as paper, wood, cloth, glass fibers in felted, woven or other form, concrete, linoleum, synthetic boards, etc. These new synthetic materials can be also employed in making laminated fibrous sheet materials wherein superimposed layers of cloth, paper, glass fabrics or mats, etc., are firmly bonded together with these new compositions. Also, these new mixtures comprising at least one polymer of this invention and at least one other aliphatic resin, with or without modifying agents, can be cast under pressure while being irradiated.

In preparing the interpolymerization products of the cross-linkable polymer of this invention and a modifying monomer or polymer, the crosslinkable polymer of this invention can constitute as much as 98 to 99 percent by weight of the whole. In other cases the modifying monomer or polymer, alone or admixed with comonomers or modifiers can constitute as much as 98 to 99 percent by weight of the whole.

In general, the proportions of the components used in a particular formulation will depend upon the particular properties desired in the interpolymer. For most applications, it is preferred to use 20 to 80 percent of the crosslinkable polymer of this invention and from 80 to 20 percent of the modifying polymer or monomer, since within these ranges interpolymers best adapted for most commercial applications can be produced.

Within these ranges the new interpolymers have a wide range of properties. For example, depending upon the particular crosslinking polymer and any modifying polymer or monomer, the particular proportions thereof, the conditions of polymerization, such as the temperature, pressure, presence or absence of additives, etc., the irradiation dose, and the extent of polymerization, they can vary from soft flexible bodies to hard rigid masses of varying resistance to solvents.

For coating or impregnating applications where the presence of a small amount of solvent in the cured composition is not objectionable, the mixed starting component can be diluted with volatile or non-volatile solvents or diluents best suited for the particular service application, and then can be polymerized after the application of the solution to the particular article to be coated or impregnated, or impregnated and coated. By suitable selection of the starting material and the conditions of the interpolymerization, interpolymers can be obtained in an insoluble, infusible state practically resistant to the destructive effect of other chemical bodies, such as acid, bases, salts, solvents, swelling agents, and the like.

When it is desired to modify the properties of the cross-linkable polymers of this invention, this can be accomplished by copolymerizing a mixture comprising at least one such polymer with at least one copolymerizable monomer containing at least one unsaturated ethylenic, or acetylenic hydrocarbon radical, more particularly a $CH_2=C<$ radical, such as vinyl, allyl, methallyl, vinylidene, etc., or with a copolymerizable compound containing a —CH=CH—, or a —CH=C< or a >C=O< grouping, for example as in vinylidene fluoride, vinylidene cyanide, vinyl propionate, maleic anhydride, or its esters and amides, methyl maleic anhydride, tetrafluoroethylene, etc.

Additional examples of copolymerizable comonomers are monomeric or partially polymerized vinyl esters, such as the acetate, propionate, etc., vinyl ketones, methyl vinyl ketone, olefinic nitriles, such as acrylonitrile, methacrylonitrile, fumaryl nitrile, beta-cyano-ethylacrylate, acrylic and methacrylic esters, for example, methyl acrylate, ethyl acrylate, propyl acrylate, butyl acrylate, ethyl methacrylate, propyl methacrylate, butyl methacrylate, actyl methacrylate, glycol dimethacrylate, allyl methacrylate, etc.; itaconic esters, for example, dimethyl itaconate, diethyl itaconate, diallyl itaconate; olefinic amides, for example, acrylamide, itaconamide, the maleic mono- and di-amides, and the corresponding imides, etc., the vinyl ethers, for example, vinyl butyl ether, vinyl isobutyl ether, vinyl cyclohexyl ether, the dienes, etc., for example, butadiene, isoprene, dimethyl butadiene, etc., styrene, the o-, m-, and p-methyl and chloro styrenes, etc.

In preparing copolymers of the crosslinkable polymers with polymerizable comonomers such as methyl methacrylate, styrene, acrylonitrile, and the like, the crosslinkable polymer can constitute as little as 0.1 percent by weight of the whole, whereas in other cases the crosslinkable polymers can constitute as much as 98 to 99 percent of the whole. The proportion of the components in a particular formulation will depend upon the particular comonomers used and the particular properties desired in the copolymer. The polymers and copolymers can be prepared most readily by ionizing radiation.

Various methods of practicing the invention are illustrated by the following examples. These examples are intended merely to illustrate the invention and not in any sense to limit the manner in which the invention can be practiced. The parts and percentages recited therein and all through this specification, unless specifically provided otherwise, refer to parts by weight and percentages by weight.

EXAMPLE I (a) In a suitable apparatus equipped with a stirrer, reflux condenser, an inert gas inlet, heating mantle and thermostatic control, are placed 450 parts of glycidyl acrylate and 550 parts of methyl ethyl ketone. The apparatus is first swept with nitrogen and a nitrogen atmosphere is maintained above the reaction mass. To the above solution is added 5.0 parts of azobisisobutyronitrile, and the temperature raised to and maintained at 75–80° C. for a period of two hours. A clear, viscous solution of homopolymer in quantitative yield is obtained which has the repeating unit structure,

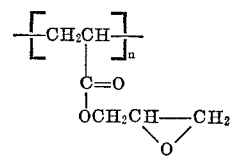

(b) The solution of the product Ia is added slowly with rapid stirring to 2500 parts of hexane; a fine precipitate forms which is removed by filtration, and is dried in a vacuum oven at 25° C. for twenty-four hours. There is thereby isolated the solid polymer having an epoxy number corresponding to 97% of structure Ia.

(c) A mixture of 127 parts of solid polymer Ia and 282.5 parts of oleic acid are mixed in a reaction flask and heated under nitrogen at 180° C. for about thirty minutes or until a test sample placed on a glass plate is not inhomogeneous but remains clear when cooled to 30–40° C. This gives the crosslinkable polymer having the repeating unit structure,

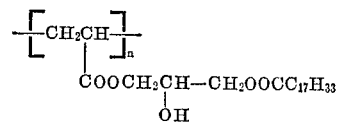

(d) To a 35% solution of Ic in toluene containing 60 parts of trimethyl amine is slowly added at 25° C. a solution of 60 parts of acryloyl chloride in 125 parts of toluene during the course of one hour. The solid $(CH_3)_3N \cdot HCl$ is removed by filtration and the toluene solution is washed with distilled water and dried over anhydrous magnesium sulfate yielding a solution of the polymer having the repeating structure

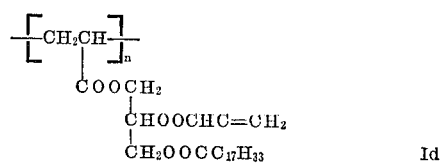

(e) A sample of the solution Id, to which is added 0.05% of a commercial metallic naphthenate drier, is cast on an aluminum sheet and allowed to airdry overnight. The resulting film is insoluble in toluene, acetone and hexane.

(f) A sample of solution Id, to which is added 0.25% of cumene hydroperoxide is cast on a glass plate and placed in an oven at 75° C. At the end of three hours, an insoluble, infusible film is obtained. When the hydroperoxide is omitted from the formulation, curing to the insoluble form occurs when the film is heated at 100 to 118° C. for thirty to sixty minutes.

(g) A sample of solution Id is cast on a glass plate and the solvent removed in an oven at 50° C. The resulting soluble film is then exposed, in the presence of air, to the beam of a I MEV Van der Graaff accelerator and the sample becomes crosslinked and infusible at a dosage of 3.7 to 4.2 megarads; the surface of the film is not tacky. In contrast, when the polymer containing the repeating structure

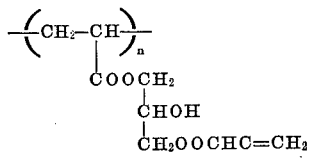

is irradiated in the same manner, a crosslinked polymer is also obtained but the surface is tacky as a result of oxygen inhibition.

(h) The procedure of Example I(d) above is repeated using 94 parts of methacrylic chloride instead of acrylic chloride and there is obtained the polymer

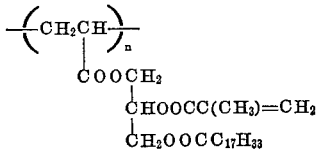

which also yields insoluble films when crosslinked by the procedures of Examples I(e), I(f) and I(g).

EXAMPLE II

The procedure of Example I(c) is repeated four times using instead of oleyl chloride, equivalent weights of the acid chlorides of linoleic acid, linolenic acid, dehydrated castor oil acid and the mixed fatty acids of tung oil. The four resulting hydroxy esters are converted to the acrylic esters by the procedure of Example I(d) and are readily crosslinked by the procedures of Examples I(e), I(f) and I(g).

EXAMPLE III

The procedure of Example I(c) is repeated in the presence of 0.5% of tertiary butyl catechol using instead of oleic acid, 336 parts of acryloleyl anhydride,

and there is obtained the polymer

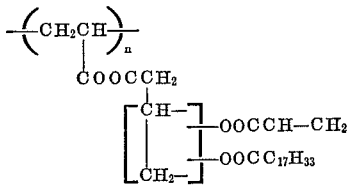

which crosslinks readily with radical initiators, metallic dryer, ultraviolet light and ionizing radiation.

EXAMPLE IV (a) The procedure of Example I(c) is repeated using 142 parts of oleic acid, then the polymer is dissolved in 250 parts of toluene to which is added 2 parts of triethyl amine and 36 parts of acrylic acid and the mixture heated at 70° C. for two and one-half hours and there is obtained a solution of the polymer containing the two repeating units in approximately equal molar parts,

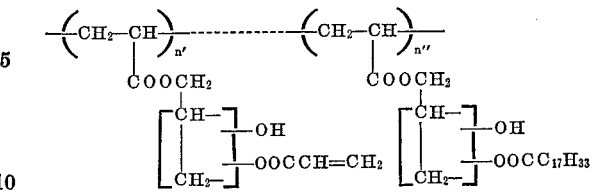

wherein $n'$ and $n''$ are approximately equal in value.

(b) The molar ratios of $n'$ to $n''$ in Example IV(a) are varied from 9 to 1 to 1 to 9 by using the following parts of oleic and acrylic acids.

| Ratio: | Parts Oleic acid | Parts Acrylic acid |
|---|---|---|
| 9:1 | 255.6 | 7.2 |
| 7:3 | 198.5 | 21.6 |
| 3:7 | 85.1 | 50.4 |
| 1:9 | 28.4 | 72.0 |

(c) The hydroxy groups in the polymers of Examples IV(a) and IV(b) are converted to acetate esters by reaction with acetic anhydride, or acetyl chloride by the procedure of Example I(d) to yield polymers having the respective ratios of $n'$ to $n''$ with the structures

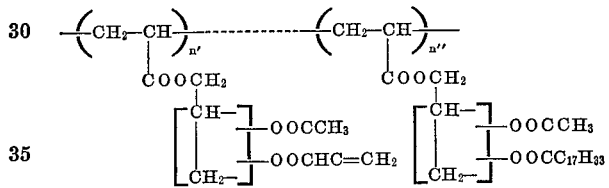

(d) The polymers of Examples IV(a), IV(b) and IV(c) are converted to the insoluble, infusible state by the procedures given in Examples I(e), I(f) and I(g).

EXAMPLE V (a) The procedure of Example IV is repeated using first 280 parts of oleyl anhydride, $(C_{17}H_{33}CO)_2O$, instead of the oleic acid, and then 63 parts of acrylic anhydride instead of the acrylic acid and there is obtained the polymer having the repeating units

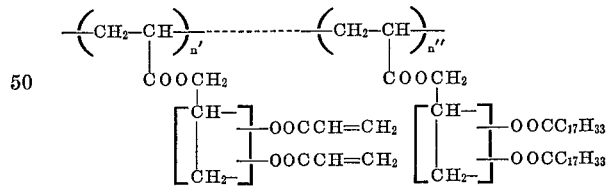

wherein $n'$ is approximately equal to $n''$.

(b) Substitution in Example V(a) of an equivalent amount of acetyl oleyl anhydride for the oleyl anhydride, and of acetyl acrylic anhydride for the acrylic anhydride yield the polymer

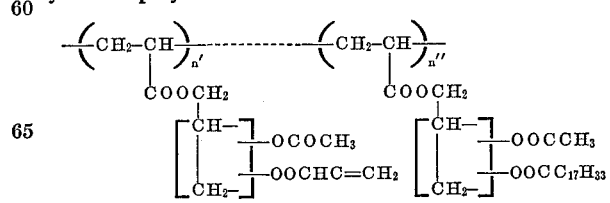

(c) The procedures of Examples V(a) and V(b) are repeated varying the molar ratios of the pair of anhydrides between 9 to 1 and 1 to 9 and polymers in which the ratio of $n'$ to $n''$ are 9 to 1 to 1 to 9 are obtained.

(d) When the polymers of Examples V(a), V(b) and V(c) are treated according to the procedures of Examples I(e), I(f) and I(g), insoluble polymers are obtained.

EXAMPLE VI

The procedure of Example I is repeated using an equivalent amount of glycidyl methacrylate instead of glycidyl acrylate followed by the procedures of Examples II to V respectively.

EXAMPLE VII

The following copolymers are prepared using 120 parts of methylisobutylketone with 100 parts of monomer by refluxing the mixtures for three hours under a nitrogen atmosphere.

|  | Copolymer | | | |
| --- | --- | --- | --- | --- |
|  | A | B | C | D |
| Methyl methacrylate (parts) | 95.0 | 90.0 | 85.0 | 80.0 |
| Glycidyl methacrylate (parts) | 5.0 | 10.0 | 15.0 | 20.0 |
| Azobisisobutyronitrile (parts) | 3.0 | 3.0 | 3.0 | 3.0 |
| Percent solids | 43.4 | 43.4 | 42.9 | 42.8 |

These copolymers have the repeating structures

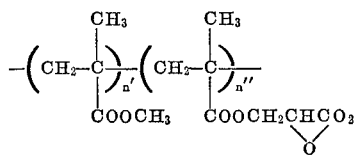

The solid copolymers are isolated from the solution by the procedure of Example I(b).

EXAMPLE VIII

The procedures of Examples I(c) to I(h) inclusive, II, III, IV and V are repeated using an amount of the components corresponding to the equivalent amount of epoxy moieties in the copolymers of Example VII and in all cases crosslinkable polymers are obtained which become insoluble when cured.

EXAMPLE IX

The procedure of Example VII is repeated five times using in each case 30 mole percent of glycidyl acrylate and 70 mole percent of vinyl acetate, acrylonitrile, vinyl chloride, N,N-dimethylacrylamide and styrene respectively, as comonomers. Similar results are obtained as in Example VII, except that the structure of the repeating unit derived from the monomer varies according to the structure of the respective comonomers.

EXAMPLE X

Substitution in Example VIII of the copolymers of Example IX for the copolymers of Example VII yields crosslinkable polymers which become insoluble when cured.

While certain features of this invention have been described in detail with respect to various embodiments thereof, it will, of course, be apparent that other modifications may be made within the spirit and scope of this invention and it is not intended to limit the invention to the exact details except insofar as they are defined in the following claims:

The invention claimed is:

1. A crosslinkable polymer having a plurality of repeating units in the linear chain thereof selected from the class consisting of:

(1) the repeating unit

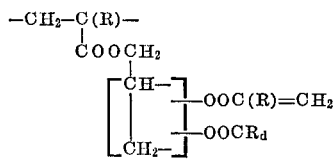

and (2) a mixture of repeating units

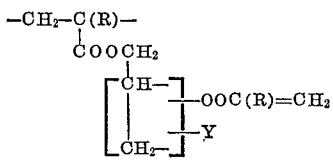

and

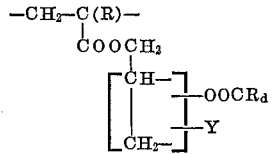

wherein there are at least two of said repeating units, R is selected from the class consisting of hydrogen and methyl, $R_d$ represents an unsaturated hydrocarbon group containing 15 to 20 carbon atoms and consisting of a terminal $CH_3$ group, at least one and no more than four —CH=CH— groups and the remainder being —$CH_2$— groups, and Y is selected from the class consisting of OH and R'COO wherein R' is a monovalent hydrocarbon radical containing one to twenty carbon atoms.

2. The polymer of claim 1 wherein the repeating unit has the formula

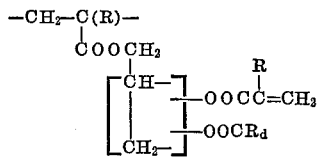

3. The polymer of claim 1 wherein the repeating units are a mixture of repeating units having the formulas

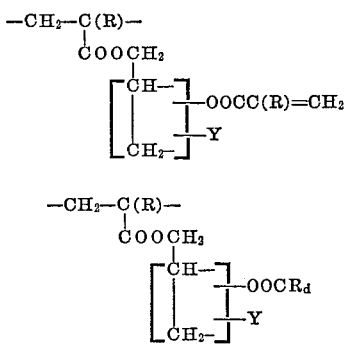

4. The product of claim 2 in which each R is H.
5. The product of claim 2 in which each R is $CH_3$.
6. The product of claim 2 in which one R is H and one R is $CH_3$.
7. The product of claim 3 in which each R is H.
8. The product of claim 3 in which Y is OH.
9. The product of claim 3 in which Y is $CH_3COO$—.
10. The product of claim 1 in which $R_dCOO$— is a mixture of radicals containing 16 to 20 carbon atoms in $R_d$.
11. The product of claim 2 in which $R_d$ is $C_{17}H_{33}$.
12. The product of claim 2 in which $R_d$ is $C_{17}H_{31}$.
13. The product of claim 3 in which $R_d$ is $C_{17}H_{33}$.
14. The product of claim 3 in which $R_d$ is $C_{17}H_{31}$.
15. The polymer of claim 2 having the repeating unit

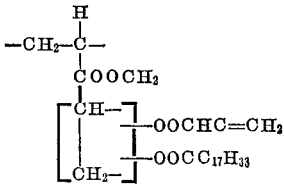

16. The polymer of claim 3 having the repeating units

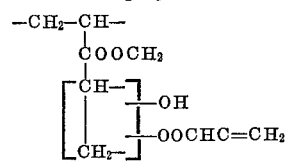 and 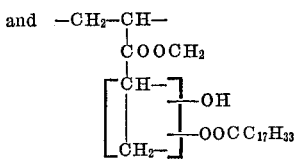

17. The polymer of claim 3 having the repeating units

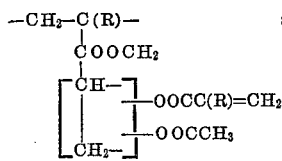 and 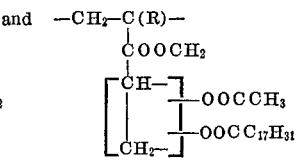

18. The process of preparing a crosslinkable polymer of claim 1 comprising the step of reacting a starting polymer having a plurality of repeating units therein having the formula

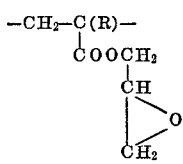

wherein R is selected from the class of H and $CH_3$; with a member selected from the class consisting of (1) $CH_2=C(R)COOOCR_d$; (2) the pair of anhydrides $[CH_2=C(R)CO]_2O$ and $(R_dCO)_2O$ (3) the pair of anhydrides $CH_2=C(R)COOOCR'$ and $R_dCOOOCR'$ (4) the pair of acids $CH_2=C(R)COOH$ and $R_dCOOH$ and (5) the pair of acid chlorides $CH_2=C(R)COCl$ and $R_dCOCl$ in the temperature range of 20 to 120° C., said starting polymer having at least two such repeating units per 100 repeating units therein.

References Cited
UNITED STATES PATENTS

| | | | |
|---|---|---|---|
| 2,504,082 | 4/1950 | Neher et al. | 260—89.5 |
| 3,284,385 | 11/1966 | D'Alelio | 260—89.5 |
| 3,330,814 | 7/1967 | Vasta | 260—23 EP |
| 3,448,089 | 6/1969 | Celeste | 260—85.5 ES |
| 3,530,100 | 9/1970 | D'Alelio | 260—85.5 OT |

HARRY WONG, JR., Primary Examiner

U.S. Cl. X.R.

117—145, 148, 155; 161—247; 204—159.16; 260—4, 17.4, 47, 63, 78.5, 80.3, 83.5, 85.5, 85.7, 86.1, 86.3, 86.7, 88.1, 89.5, 857, 859, 860, 873, 899, 901